US008354019B2

(12) United States Patent
Laredo Sanchez et al.

(10) Patent No.: US 8,354,019 B2
(45) Date of Patent: Jan. 15, 2013

(54) PROCESS FOR REDUCING BENZENE CONTENT OF HYDROCARBON STREAM USING MICROPOROUS CARBON ADSORBENT

(75) Inventors: Georgina Cecilia Laredo Sanchez, Mexico City (MX); J. Jesus Castillo Munguia, Mexico City (MX); Fidencio Hernandez Perez, Mexico City (MX); Ricardo Saint Martin Castanon, Mexico City (MX); Maria del Carmen Martinez Guerrero, Mexico City (MX); Federico Jesus Jimenez Cruz, Mexico City (MX); Obet Marroquin de la Rosa, Mexico City (MX); Jose Luis Cano Dominguez, Mexico City (MX)

(73) Assignee: Instituto Mexicano del Petroleo, Mexico City (MX)

( * ) Notice: Subject to any disclaimer, the term of this patent is extended or adjusted under 35 U.S.C. 154(b) by 556 days.

(21) Appl. No.: 12/519,545

(22) PCT Filed: Nov. 23, 2007

(86) PCT No.: PCT/MX2007/000139
§ 371 (c)(1),
(2), (4) Date: Jun. 17, 2009

(87) PCT Pub. No.: WO2008/075934
PCT Pub. Date: Jun. 26, 2008

(65) Prior Publication Data
US 2010/0025303 A1    Feb. 4, 2010

(30) Foreign Application Priority Data
Dec. 19, 2006    (MX) .................. PA/a/2006/015023

(51) Int. Cl.
*C10G 25/00* (2006.01)
*C10G 25/12* (2006.01)
*C07C 7/12* (2006.01)
(52) U.S. Cl. ......... 208/307; 208/305; 585/826; 585/827
(58) Field of Classification Search .................. 208/305, 208/307; 585/826, 827
See application file for complete search history.

(56) References Cited

U.S. PATENT DOCUMENTS

| | | | |
|---|---|---|---|
| 1,993,345 A * | 3/1935 | Jones ............................. 502/22 |
| 2,856,444 A * | 10/1958 | Pollock ..................... 208/310 R |
| 4,140,622 A | 2/1979 | Herout et al. |
| 4,209,383 A | 6/1980 | Herout et al. |
| 4,439,349 A * | 3/1984 | Everett et al. ................. 502/180 |
| 4,747,855 A | 5/1988 | Hirai et al. |
| 4,975,179 A | 12/1990 | Harandi et al. |
| 4,997,543 A | 3/1991 | Harandi et al. |
| 5,003,118 A | 3/1991 | Low et al. |
| 5,053,573 A | 10/1991 | Jorgensen et al. |
| 5,082,983 A | 1/1992 | Breckenridge et al. |
| 5,120,890 A | 6/1992 | Sachtler et al. |
| 5,149,894 A | 9/1992 | Holtermann et al. |
| 5,185,486 A | 2/1993 | Collin et al. |
| 5,186,819 A | 2/1993 | Kaul et al. |
| 5,198,102 A | 3/1993 | Kaul et al. |
| 5,210,333 A * | 5/1993 | Bellows et al. ............... 208/317 |
| 5,210,348 A | 5/1993 | Hsieh et al. |
| 5,254,763 A | 10/1993 | Gill et al. |
| 5,273,644 A | 12/1993 | Wegerer |
| 5,294,334 A | 3/1994 | Kaul et al. |
| 5,336,820 A | 8/1994 | Owen et al. |
| 5,347,061 A | 9/1994 | Harandi et al. |
| 5,360,534 A | 11/1994 | Rice et al. |
| 5,380,425 A | 1/1995 | Child et al. |
| 5,414,172 A | 5/1995 | Chin et al. |
| 5,457,252 A | 10/1995 | Gill et al. |
| 5,491,270 A | 2/1996 | Chin et al. |
| 5,545,788 A | 8/1996 | Cheng et al. |
| 5,817,227 A | 10/1998 | Mikitenko et al. |
| 6,048,450 A | 4/2000 | Mikitenko et al. |
| 2006/0081500 A1 * | 4/2006 | Bitterlich et al. ............... 208/92 |

OTHER PUBLICATIONS

A. N. Ainscough, Adsorption Capacity of Molecular Sieve Type Carbons, 3 LANGMUIR 708-713 (1987).*

* cited by examiner

*Primary Examiner* — Randy Boyer
(74) *Attorney, Agent, or Firm* — Roylance, Abrams, Berdo & Goodman, L.L.P.

(57) ABSTRACT

The present invention is related with the application of an adsorbent material of microporous carbon (MCA), prepared from the direct pyrolysis of copolymers generically known as Saran, in adsorption processes to reduce the benzene content in naphtha boiling range hydrocarbon streams, between 27 and 191° C., in which is preferable to perform a first separation by distillation of the C6's fraction, and a further separation of Benzene by adsorption through an adsorbent material bed, obtaining the fraction of C6's free of Benzene and an adsorbent with Benzene, which is further regenerated by pressure or temperature swing desorption or by displacement using a desorbent such as an inert gas at high temperature or by passing a desorbent which after the process, the desorbent and Benzene are separated by distillation. The fraction of C6's free of Benzene is reintegrated to the hydrocarbon stream and providing a gasoline with a Benzene content less than 1 volume %. Besides, the application of the MCA in this type of process allows obtaining Benzene with a minimum purity of 99.8 weight % and a maximum toluene content of 0.1 weight %, satisfying the specifications of ASTM D-2359-02 for Refined Benzene-535.

15 Claims, 3 Drawing Sheets

Figure 1:
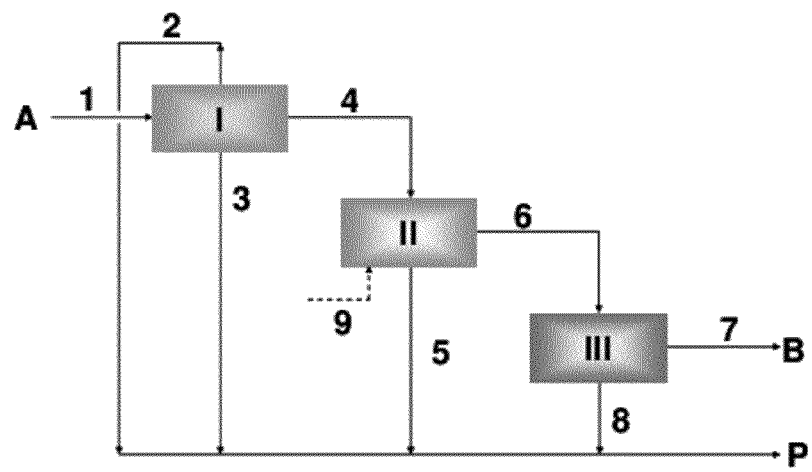

PROCESS FOR REDUCING BENZENE CONTENT OF HYDROCARBON STREAM USING MICROPOROUS CARBON ADSORBENT

TECHNICAL FIELD OF THE INVENTION

The present invention is related to the application of a microporous carbon adsorbent (MCA) material obtained from pyrolysis of Saran copolymers, in adsorption processes for reducing the benzene content in naphtha boiling range hydrocarbon streams (IBP 27 to FBP 191° C.) to less than 1 volume %. Additionally, the adsorbed benzene in the MCA could be purified to a 99.8 weight % with a minimum of 0.1 weight % of toluene that could satisfy the ASTM D 2359-02 standard specifications for refined Benzene-535.

BACKGROUND OF THE INVENTION

According to the Phase 2 of the Reformulated Gasoline (RFG) and Mobile Source Air Toxic (MSAT), programs, the actual benzene specification content in gasoline is less than 1 volume %; additionally, the Phase 3 of the RFG program and the California Air Resources Board (CARB) are established a gasoline benzene content up to 0.8% volume %. (http://www.mathproinc.com/pdf/2.1.4_Regulatory_Programs.pdf). Finally, the Environmental Protection Agency (EPA) is foreseeing regulations even more restricted before 2010, indicating the importance of gasoline benzene reduction.

In the gasoline mixture usually known as gasoline pool, approximately 81% of the benzene comes from reforming gasoline, 17% from FCC gasoline and 2% from other hydrocarbon streams, therefore, in order to comply with regulations and obtain a final product with less than 1 volume % of benzene, it is becoming a priority to reduce the benzene content from reformate.

Usually, if the processes used to reduce the benzene content are applied before the reforming process, they are called pretreatment processes, if they are used afterwards, they are denominated postreatment processes.

1) Pretreatment processes. This type of processes removes benzene precursors from the reforming feedstock. Therefore, the reformate obtained is produce with reduced benzene content. According to the state of the art, these types of processes are described in the patents U.S. Pat. No. 4,975,179 and U.S. Pat. No. 5,414,172.

2) Postreatment processes. The processes to reduce benzene by reformate postreatment are: hydrogenation, olefin alkylation and selective adsorption. Most of these postreatment processes involve two steps: first, a fractionation step is usually performed in order to obtain a benzene rich fraction ("hearthcut fraction") followed by hydrogenation, alkylation or adsorption processes for final benzene reduction.

Among the processes involving hydrogenation postreatment are found in the patents U.S. Pat. No. 5,003,118, U.S. Pat. No. 5,254,763, U.S. Pat. No. 5,457,252, U.S. Pat. No. 5,817,227 and U.S. Pat. No. 6,048,450.

Most of the postreatment processes for reducing benzene contents in gasoline are based in alkylation with light olefins and an acid catalyst. Among the most recent patents considering this option are found in: U.S. Pat. No. 4,140,622, U.S. Pat. No. 4,209,383, U.S. Pat. No. 4,997,543, U.S. Pat. No. 5,053,573, U.S. Pat. No. 5,082,983, U.S. Pat. No. 5,120,890, U.S. Pat. No. 5,149,894, U.S. Pat. No. 5,185,486, U.S. Pat. No. 5,210,348, U.S. Pat. No. 5,273,644, U.S. Pat. No. 5,336,820, U.S. Pat. No. 5,347,061, U.S. Pat. No. 5,360,534, U.S. Pat. No. 5,380,425, U.S. Pat. No. 5,491,270 and U.S. Pat. No. 5,545,788. Most of this alkylation patents are associated to benzene fraction enrichment ("hearthcut fraction").

Postreatment processes related to adsorption are further described.

The patents U.S. Pat. No. 5,186,819, U.S. Pat. No. 5,198,102 and U.S. Pat. No. 5,294,334 describe methods to selectively separate benzene from 27-191° C. gasoline fractions. Therefore, whereas the patent U.S. Pat. No. 5,186,819 describe a separation by selective adsorption, in patents U.S. Pat. No. 5,198,102 and U.S. Pat. No. 5,294,334 a benzene rich fraction (49 to 88° C. and 50 to 90° C., respectively) is obtained first by fractionated distillation, followed by a solid adsorbent selective adsorption of benzene. According to these patents a stream with minimum benzene content is obtained and the saturated adsorbent is regenerated by using a solvent capable of desorbing benzene. The use of zeolites X, Y and MOR interchanged with lithium, sodium, potassium rubidium or cesium, preferably NaX and NaY, but more preferably partial dehydrated zeolite NaY are reported in these patents. In the U.S. Pat. No. 5,186,819 and U.S. Pat. No. 5,198,102 patents, the desorbent used is toluene or xylene, preferably toluene. In the U.S. Pat. No. 5,294,334 patent, cyclohexane is used as desorbent. The desorbent is separated from benzene by distillation and is recycled to the adsorption zone. The processes of these referred patents can be carried out in a fixed-bed, simulated moving bed and magnetically stabilized bed.

A method for benzene selective separation and hydrogenation from naphtha boiling range hydrocarbon streams (27-191° C.) by passing this fraction trough a selective adsorbent bed and a hydrogenation catalyst, is described in U.S. Pat. No. 5,210,333 patent. Adsorbents used are zeolites X, Y and MOR interchanged with lithium, sodium, potassium rubidium or cesium, preferably NaX and NaY, but more preferably partial dehydrated zeolite NaY. Benzene is hydrogenated to cyclohexane by using a hydrogen activated catalyst, preferably with a platinum metal. This catalyst is supported over either the adsorbent or other material mixed with the adsorbent. The cyclohexane desorption is performed by a desorbent such as benzene, toluene, xylene, ethylbenzene or a mixture thereof. The patented process can be carried out in a fixed-bed, simulated moving bed and stabilized magnetically bed.

It should be noted that carbon molecular sieves or microporous carbon adsorbent (MCA) coming from pyrolysis of Saran were never used as adsorbent material in benzene separation.

Separation techniques based on adsorption processes, are known in the state-of-the-art, and among of them are temperature swing adsorption (TSA), pressure swing adsorption (PSA), elution or countercurrent chromatography, and the result of the combination thereof. These processes involve the contact of a liquid or gaseous mixture over a fixed bed of adsorbent in order to remove some of the components which can be adsorbed. Desorption can be carried out by various methods. Regeneration by pressure change is used in the PSD, an increment of temperature is employed to force desorption in a TDS process. The bed of adsorbent is regenerated by heating with pre-heated gas recirculation in an either opened or closed circuit, usually in the contrary direction which the adsorption was carried out. Other regeneration method by displacement involves the use of a desorbent which can be separated from the extract and the raffinate by distillation.

Benzene reduction by adsorption using the MCA prepared from the pyrolysis of the generically known copolymers of Saran is superior to prior technologies, which are known by the applicant. The adsorption process object of this invention reduce the benzene content from naphtha boiling range hydrocarbon streams (27 and 191° C.) by a two steps procedure: 1) separation by fractionation of C6's fraction, boiling point of 50 and 90° C. (benzene hearthcut fraction), and 2) adsorption of the benzene from the hearthcut fraction by passing this stream through a bed of MCA.

Therefore, is one object of the present invention to apply the highly selective microporous carbon adsorbent (MCA) for aromatic—non aromatic compounds separations, obtaining from the pyrolysis of the generically known Saran copolymers, in adsorption processes to reduce the benzene content in naphtha boiling range hydrocarbon streams.

Other object of the present invention is the application of the MCA in processes to produce gasoline with low benzene content from reforming and hydrocracked streams, cracked naphtha and hydrotreated cracked naphtha.

An additional object of the present invention is the application of the MCA to produce benzene free gasoline, which after being incorporated to the gasoline pool will produce gasoline with a benzene content of 1 volume % or less.

An additional object of the present invention is the application of the MCA to produce benzene with minimum purity of 99.8 weight % and maximum toluene content of 0.1 weight %, satisfying the ASTM D-2359-02 standard specifications for refined benzene-535.

The aforementioned and more objects in the present invention will be established in detail in the next chapters.

BRIEF DESCRIPTION OF THE DRAWINGS IN THE INVENTION

FIG. 1. Scheme for a sequential separation-adsorption-purification process for reducing benzene content in naphtha boiling range hydrocarbon streams (27 and 191° C.), by the application of microporous carbon adsorbent (MCA).

Figure 2:
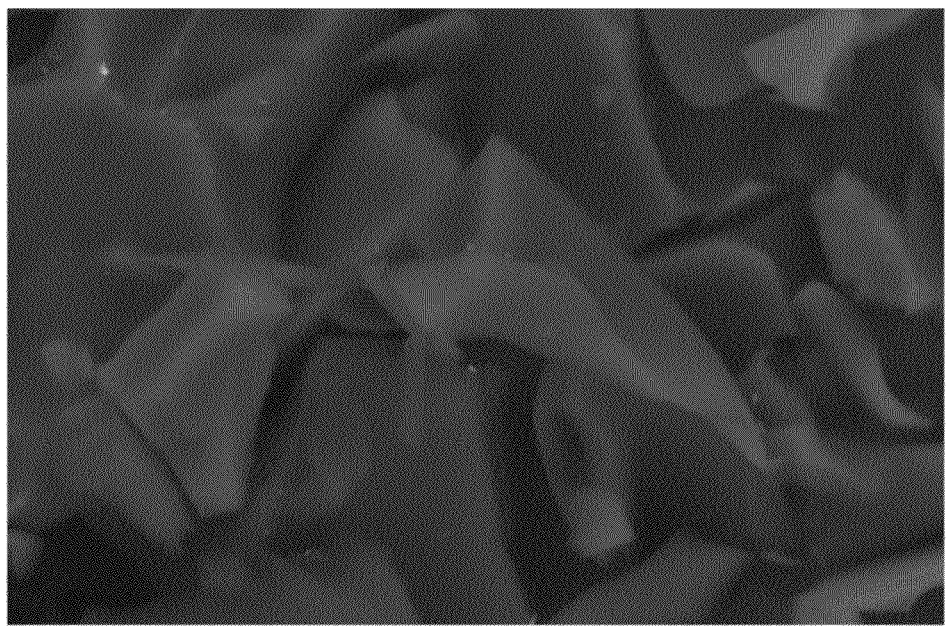

FIG. 2. Scanning electron microscopy micrograph of the MCA material used in the examples of the present invention. According to the textural analysis by nitrogen adsorption-desorption the following properties were estimated: pore size between 0.4 and 1.0 nm, with a 60% between 0.5 and 0.7 nm and a BET surface area of 815 $m^2/g$.

Figure 3:
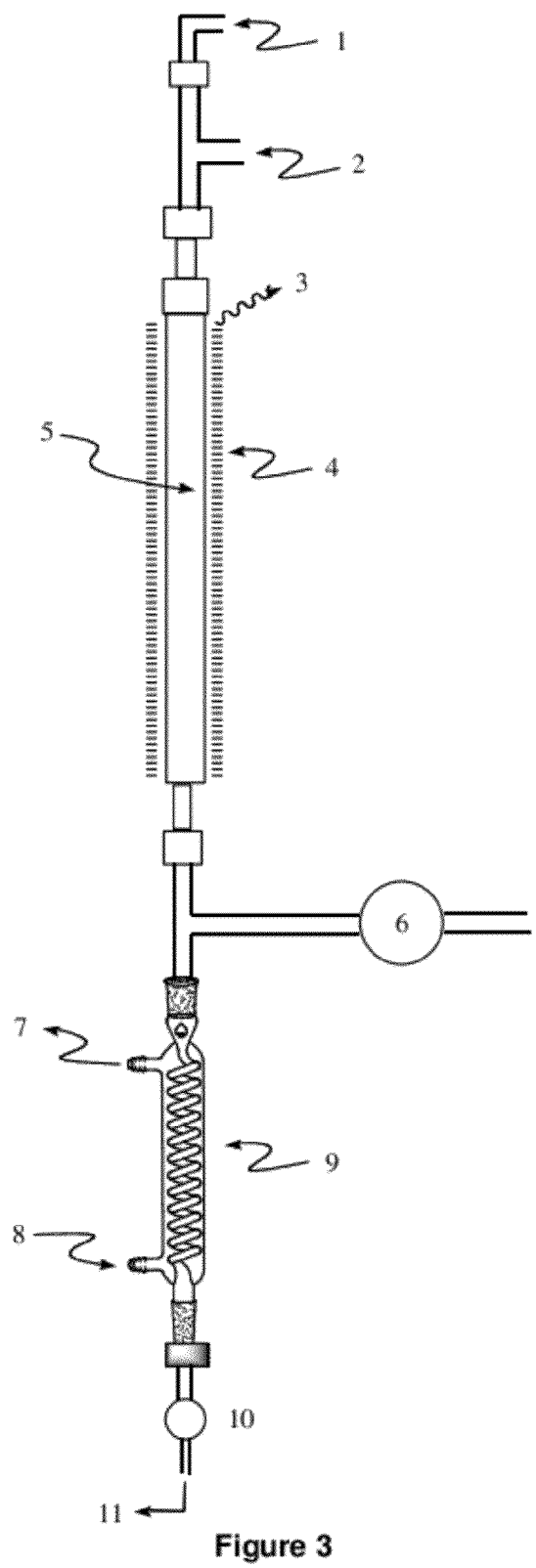

FIG. 3. Representation of the bench scale equipment used to perform the adsorption tests in gas phase of the present invention, Examples 6 to 8.

Figure 4:
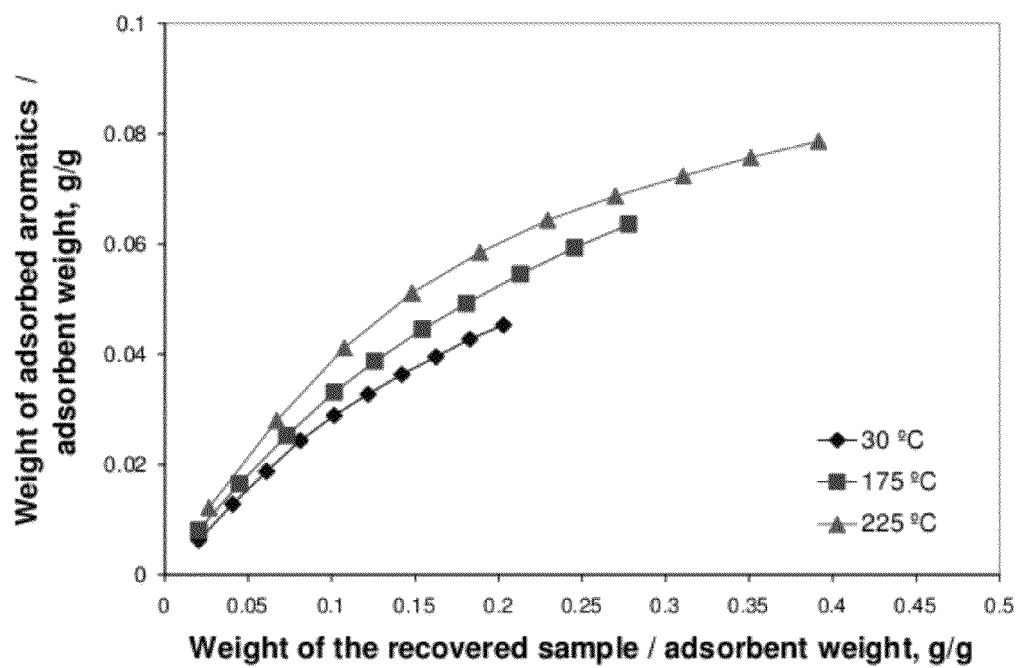

FIG. 4. Plot of the benzene adsorption results in the MCA at different temperatures.

DETAILED DESCRIPTION OF THE INVENTION

The tendencies related to gasoline benzene content to be complied according to the Reformulation Gasoline (RFG) and Mobile Source Air Toxic (MSAT) Programs, California Air Resources Board (CARB) and Environmental Protection Agency (EPA) (currently less than 1% volume) are an indication of the importance of reducing even more the benzene content in gasoline.

It is important to point out that benzene content in the gasoline pool mainly comes from the reformate stream (81%), FCC stream provides 17% and other common hydrocarbon streams provide 2% more. From the aforementioned it results that in order to adjust the gasoline pool to standard specifications (less than 1 volume % it is a priority to reduce the benzene content in reforming gasoline.

According to the previously declared, the present invention is related to the application of an microporous carbon adsorbent (MCA) material prepared from pyrolysis of copolymer generically known as Saran, in processes of adsorption to reduce the benzene content in naphtha boiling range hydrocarbon streams, between 27 and 191° C., and preferably after performing a first separation by fractionation of the C6's, which distilled between 50 and 90° C., followed by a separation of benzene from this fraction by adsorption through a bed of MCA. By means of the application of MCA, reforming gasoline is produced with less than 1 volume % of benzene which can be integrated to the gasoline pool and additionally the procedure can be supply 99.8 weight % benzene with a maximum toluene content of 0.1 weight %, satisfying the ASTM D-2359-02 standard specification described for refined benzene-535.

The feedstock which can be processed by means of the application of the MCA are all included in the naphtha boiling range hydrocarbon streams, between 27 and 191° C., preferably between 38 and 191° C., such as reformate, hydrocracking feedstock, cracked naphtha, hydrotreated cracked naphtha, preferably the reformate and hydrocracked feedstocks, and more preferably reformate feedstock.

The scheme for a sequential separation-adsorption-purification process referred to the present invention to reduce the benzene content with the application of the MCA is shown in FIG. 1, in which the hydrocarbon stream (A), in the naphtha boiling range, between 27 and 191° C., with a benzene content equal or higher than 1 volume %, is fed by means of line 1 to the benzene and lighter compounds separation section (I); in this section the feedstock is fractionated in at least three streams: a lighter benzene free fraction (2), with an average boiling point of 40° C. and less, a heavier fraction (3), with an average boiling point of 85° C. and higher, with a benzene content of less than 25 weight %, both streams are sent as products (P) by means of lines 2 and 3 respectively, whereas the intermediate fraction, with boiling range of 40 to 85° C., containing more than 75 weight % of benzene is fed to the adsorption-regeneration section (II) via line 4. To this respect, it should be noticed that in order to obtain two outlet streams from the distillation column, an alternative to the referred process in the present invention is to integrate line 2 to 4, for sending to the adsorption-regeneration section, though it is more advisable to have three outlet streams from the section 1, as is illustrated in the FIG. 1.

The adsorption-regeneration section (II) is constituted by two adsorption-regeneration units, a first one to perform the adsorption process and the other one to perform the regeneration process, or the required number of adsorption-regeneration units in order to permit the continuous regeneration of the adsorbent. The adsorption-regeneration section can operate in any type of modality, which is in fixed bed, moving bed, simulated moving bed or magnetic stabilized bed.

In section II, the adsorption and regeneration is performed at adequate temperature, preferable at the feedstock temperature, which can be from 20 to 100° C. The effluent product from the adsorption stage; which, in practice, is free of benzene and is sent to the line 5 to blend with the lighter fraction (2) and heavier (3) coming from the section 1.

The adsorption stage, from the adsorption-regeneration section, employs a microporous carbon adsorbent (MCA) material coming from the pyrolysis of poly (vinylidene chloride-co-vinyl chloride) (PVDC-PVC), poly (vinylidene chloride-co-methyl acrylate) (PVDC-AM), poly (vinylidene chloride-co-acrylonitrile) (PVDC-ACN), poly (methyl acrylate-co-acrylonitrile) (AM-ACN) and other related copolymers, which are generically known as Saran, according to the technique described in example 1. This material presents high selectivity to adsorb aromatic compounds with the consequent separation from non aromatic compounds.

The stage of regeneration of the MCA can carry out by pressure swing desorption (PSD), temperature swing desorption (TSD) or by desorbent displacement, such as inert gas at high temperature. In the FIG. 1, the desorbent feeding is indicated in the line 9. The MCA regeneration step can be operated in liquid and/or gas phase.

The product from regeneration of the MCA is sent, by means of line 6 to the benzene purification sections (III). In this section benzene is separated from co-adsorbed light hydrocarbons. The separated benzene stream is sent as product (B) by line 7. The separated light hydrocarbons fraction is sent; by means of line 8, to be incorporated with the other gasoline streams with low benzene content to obtain finally reforming gasoline with the required benzene content, followed by integration of this product to the gasoline pool in order to obtain a benzene content gasoline of less than 1 volume %.

The separated benzene, by means of the application of the MCA to reduce the benzene content in naphtha boiling range hydrocarbon streams, between 27 and 191° C., presents a minimum purity of 99.8 weight % and maximum content of toluene of 0.1 weight %, satisfying the specifications of the standard ASTM D-2359-02 for refined benzene-535.

After having described the present invention and their characteristics, the next examples are presented with illustrative purposes but not limiting the scope of the invention.

EXAMPLE 1

Preparation of the Microporous Carbon Adsorbent (MCA)

Different samples of the microporous carbon adsorbent (MCA) were prepared by direct pyrolysis of the next copolymers: Saran 415, Saran 469, Saran 43710-7, Saran XU and Saran 43040-4. The pyrolysis was performed in two stages: compressed pills of the copolymer were prepared at a pressure of 10,000 kg/cm$^2$ (9,806.65 bar). These compressed pills were placed into a quartz tube which is introduced in a cylindrical furnace with temperature control and inert atmosphere of helium, inside of fume hood with gas extraction. In the first stage the temperature is elevated at a heating rate of 5° C./min up to 300° C. (4 h). In the second stage the temperature is elevated at 900° C. with a heating rate of 5° C./min by 12 hrs. After pyrolysis, the carbonized material was milled and sieved (70-140 mesh). The yield was 25-30%. The composition of the used copolymers and the BET surface area, according to the texture analysis by nitrogen adsorption-desorption is shown in Table 1.

With these samples of the obtained MCA the preliminary tests of liquid phase adsorption were performed using a synthetic blend of quaternary composition: n-heptane (NC7), 2-methylheptane (2MC7), 2,5-dimethylhexane (25DMC6) and iso-octane (iC8 or 224TMC5), with a 25% volume composition of each one.

TABLE 1

Equilibrium adsorption in different microporous carbon adsorbents (MCAs)

| Copolymer | | | Surface area | Adsorption, g hydrocarbon/g adsorbent | | | | |
|---|---|---|---|---|---|---|---|---|
| Commercial name | Precedence company | Composition | BET m$^2$/g | 2MC$_7$ | iC8 or 224TMC$_5$ | nC$_7$ | 25DMC$_6$ | Total |
| Saran 415 | Dow Co. | PVDC-PVC | 840 | 0.077 | 0 | 0.086 | 0.042 | 0.205 |
| Saran 469 | Dow Co. | PVDC-PVC | 815 | 0.073 | 0 | 0.076 | 0.052 | 0.200 |
| Saran 43710-7 | Aldrich Chemical Co. | PVDC-PVC | 759 | 0.071 | 0 | 0.078 | 0.040 | 0.189 |
| Saran XU | Dow Co. | PVDC-AM | 763 | 0.073 | 0 | 0.085 | 0.040 | 0.198 |
| Saran 43040-4 | Aldrich Chemical Co. | PVDC-AM | 742 | 0.076 | 0 | 0.101 | 0.034 | 0.210 |

The adsorption tests were carried out as is described next: one gram of the adsorbent material prepared by pyrolysis of the respective copolymer, Saran 415, Saran 469, Saran 43710-7, Saran XU or Saran 43040-4, was placed into a 50 ml micro-reactor with temperature control and stirring. The tests were performed at 30° C. constant temperature and magnetic stirring between 260 and 350 rpm. For this experiments was used a 2 cm diameter star-type stir magnetic bar. After 24 h supernatant samples were withdrawn of the liquid avoiding the removal of the adsorbent, which were placed in micro vials for analyses in PIONA gas chromatography.

As it can be observed from Table 1, the results of the preliminary tests of adsorption did not show significant differences between any of the diverse materials of Saran. Due to this and because of raw material availability, the material obtained from the pyrolysis of Saran 469 was employed in the adsorption tests that illustrate the next examples. This material, identified as microporous carbon adsorbent (MCA), according to the scanning electronic microscopy (SEM) presents flakes morphology (FIG. 2) with an estimated pore size between 0.4 and 1.0 nm, preferably 0.5 and 0.7 nm and BET surface area of 815 m$^2$/g.

EXAMPLE 2

Benzene Adsorption on the Adsorbent Material of Microporous Carbon (MCA) Obtained in Pyrolysis of Saran One gram of the microporous carbon adsorbent (MCA), 70-140 mesh, obtained from the direct pyrolysis of Saran 469 according to example 1 of the present invention, was placed into a 50 ml micro-reactor with temperature and stirring control. 10 ml of a blend of Benzene 5% in isooctane was added to the reactor. Isooctane was used as a non adsorbing solvent in this type of material, according to the results shown in Table 1. The test was carried out at 30° C. constant temperature and magnetic stirring between 260 and 350 rpm. For these experiments a 2 cm diameter star-type magnetic stir bar was used. Samples of 0.1 ml were withdrawn at different times, which were placed in micro vials for their analysis in gas chromatography. The aliquots were obtained avoiding removing the adsorbent. An equilibrium adsorption of 322 mg de Benzene/g MCA was obtained which represents a considerable high value compared to commercial adsorbents adsorption of Example 3.

EXAMPLE 3

Relative Adsorption of Benzene and Cyclohexane in the MCA and Commercial Adsorbents Following the method described in Example 2, adsorption experiments were carried out for a 10 ml blend of a 5 weight % of benzene and 5 weight % of cyclohexane in isooctane and 1 g of the microporous carbon adsorbent (MCA) material described in present invention, and different commercial adsorbents (1 g). Details are described in Table 2.

TABLE 2

Principal features of MCA and different commercial adsorbents

| Material | Supplier | Cat. Number | BET surface area $m^2/g$ | Pore size, nm |
|---|---|---|---|---|
| MCA | IMP | — | 815 | <1 |
| Zeolite Na Y | Zeolyst | CBV 100 | 900 | 0.78 |
| Zeolite Ag Y | Zeolyst* | CVB 780* | 780 | 0.78 |
| Activated carbon | Calgon | Centaur ® | 891 | >0.6 |
| Silica Gel | Aldrich | 403563 | 750 | >1.0 |

*Interchanged with Ag, according to A. Takanashi, R. T. Yang, AIChE J., 48 (7), 1457-1467 (2002)

In Table 2 can be noticed that the MCA presents a BET surface area and pore size with average values similar to commercial adsorbents.

The results of equilibrium adsorption of benzene and cyclohexane in the MCA and in various other commercial adsorbents are shown in Table 3.

TABLE 3

Equilibrium adsorption of Benzene and Cyclohexane in MCA and various commercial adsorbents

| Adsorbent | Adsorption, mg/g adsorbent | | | Selectivity Benzene: Cyclohexane |
|---|---|---|---|---|
| | Benzene | Cyclohexane | Total | |
| MCA | 290 | 14 | 304 | 20.7:1 |
| Zeolite Na Y | 85 | 10 | 95 | 8.5:1 |
| Zeolite Ag Y | 102 | 9 | 111 | 11.1:1 |
| Activated Carbon | 104 | 12 | 116 | 8.7:1 |
| Silica Gel | 90 | 11 | 101 | 8.2:1 |

As can be observed in Tables 2 and 3, although the activated carbon presents a BET surface area (891 $m^2/g$) higher than the MCA (815 $m^2/g$); the MCA presents benzene and total (benzene and cyclohexane) higher adsorption capacity, (186 and 188 mg/g, respectively), than activated carbon. Additionally, it is important to notice that the MCA presents a higher benzene:cyclohexane selectivity (20.7:1).

EXAMPLE 4

Preparation of the Feedstock for Benzene Adsorption

The feedstocks for benzene adsorption used in the experiment related to this invention were prepared from typical reforming gasoline. This due to the fact that mostly of the benzene presented in the gasoline mixture usually known as gasoline pool, comes from the reforming gasoline (81%), 17% from catalytic cracking gasoline (FCC) and 2% from other common hydrocarbon streams. Therefore, in order to achieve a gasoline pool with the specification of at less of 1 volume % of benzene is a priority to reduce the benzene content in the reforming gasoline.

The reforming gasoline, with approximate boiling range of 40 and 200° C., was fractionated by distillation to obtain fractions in the intervals of either 5 or 10° C. which were analyzed by gas chromatography with the main objective of identifying benzene presence. It should be noticed that only in the fractions 2 to 11 a significant benzene presence was detected. The results are shown in Table 4.

In the same table, it can be observed that from Fraction 8 the presence of toluene is significant, 24.8 g (4 a 6 weight %). For this reason, in order to study only benzene adsorption, the tests were carried out with fractions 2 to 7, which were named as $F_{40-85}$. As is shown in the Table 4, in the $F_{40-85}$ fraction the major benzene proportion from the reforming gasoline (77.93 weight %) is contained, therefore elimination of this amount of benzene, considering that more than 80% in the gasoline pool is coming from the reformate, will imply a considerable reduction of the benzene content in the final product.

TABLE 4

Benzene and toluene in the light fractions of Reformate Gasoline

| Fraction | Interval of Temperature, ° C. | weight, g | | | weight % | |
|---|---|---|---|---|---|---|
| | | Fraction | Benzene | Toluene | Benzene | Toluene |
| 1 | TIE-40 | 585.2 | 0.00 | 0.00 | 0.00 | 0.00 |
| 2 | 40-50 | 205.1 | 3.28 | 0.00 | 1.60 | 0.00 |
| 3 | 50-60 | 843.9 | 42.20 | 0.00 | 5.00 | 0.00 |
| 4 | 60-70 | 1,296.8 | 220.46 | 0.00 | 17.00 | 0.00 |
| 5 | 70-75 | 558.1 | 179.15 | 0.56 | 32.10 | 0.10 |
| 6 | 75-80 | 388.0 | 114.07 | 2.72 | 29.40 | 0.70 |
| 7 | 80-85 | 424.2 | 95.02 | 7.64 | 22.40 | 1.80 |
| 8 | 85-90 | 539.2 | 88.43 | 24.80 | 16.40 | 4.60 |
| 9 | 90-95 | 519.6 | 57.68 | 68.59 | 11.10 | 13.20 |
| 10 | 95-100 | 407.0 | 30.08 | 119.89 | 7.39 | 29.46 |
| 11 | 100-105 | 563.6 | 9.13 | 381.69 | 1.62 | 67.72 |
| TOTAL | | 6,330.7 | 839.49 | 605.88 | 13.26 | 9.57 |
| Fraction 2-7 ($F_{40-85}$) | | | | | | |
| Accumulated | | 3,716.1 | 654.18 | 10.91 | 17.60 | 0.29 |
| % relate al Total | | 58.7 | 77.93 | 1.80 | 10.33 | 0.17 |
| Fraction 8-11 ($F_{85-115}$) | | | | | | |
| Accumulated | | 2,029.4 | 185.32 | 595.0 | 9.13 | 29.32 |
| % relate al Total | | 32.1 | 22.07 | 98.20 | 2.93 | 9.40 |

In the Table 5 is indicated the composition of the fraction $F_{40-85}$ for type of compound.

TABLE 5

Composition of the feedstock for Benzene separation

| Type of Compound | % weight |
|---|---|
| Aromatics | 17.9 |
| Isoparaffin | 54.5 |
| Cycloparaffins | 3.6 |
| Olefins | 1.8 |
| Linear Paraffins | 22.2 |

Form the tables above described can be observed that the accumulated benzene and toluene contents in the fractions 2 to 7 ($F_{40-85}$) sums 17.89 weight % (Table 4), corresponding to the data of 17.9 weight % for the aromatic content described in Table 5.

In order to show the effect of the reformate benzene reduction in the total gasoline pool benzene content in a refinery, Table 6 shows the distribution of the different types of gasoline that are present in a typical refinery gasoline pool.

TABLE 6

Gasoline "Pool"

| Fraction in the "pool" | Barrels/day (BPD) | Content of Benzene, % volume | BPD of Benzene in the fraction |
|---|---|---|---|
| Reformate Gasoline | 37,096 | 4.8 | 1,781 |
| FCC Gasoline | 31,878 | 0.8 | 255 |
| Alkylated | 29,105 | 0.03 | 9 |
| Isomerized | 19,113 | 0 | 0 |
| TAME and Raffinate | 9,928 | 0 | 0 |
| H-Oil Gasoline | 3,595 | 0 | 0 |
| MTBE | 3,788 | 0 | 0 |
| TOTAL | 134,503 | 1.52 | 2,044 |

Table 6 shows that 87.1% of benzene in the pool came from the reforming gasoline (1,781 of the 2,044 BPD of benzene).

According to the results of this Example, if 77.93% of Benzene in the reforming gasoline is separated (corresponding to the fraction proportion $F_{40-85}$), by using the microporous carbon adsorbent (MCA) material in the referred process of the present invention, the gasoline pool in the refinery will have a composition as is shown in Table 7.

TABLE 7

Gasoline "Pool" with elimination of Benzene in Reformate gasoline

| Fraction in the "pool" | Barrels/day (BPD) | Content of Benzene, volume % | BPD of Benzene in the fraction |
|---|---|---|---|
| Reformate Gasoline | 35,708 | 1.1 | 393 |
| FCC Gasoline | 31,878 | 0.8 | 255 |
| Alkylated | 29,105 | 0.03 | 9 |
| Isomerized | 19,113 | 0 | 0 |
| TAME and Raffinate | 9,928 | 0 | 0 |
| H-Oil Gasoline | 3,595 | 0 | 0 |
| MTBE | 3,788 | 0 | 0 |
| TOTAL | 133,115 | 0.49 | 657 |
| Benzene | 1,388 | 99.8* minimum | 1,388 |

*weight %

Tables 6 and 7 show that the benzene content in the gasoline pool is reduced from 1.52 to 0.49 volume %, which is a 67.76% reduction. With this result, the specification for the maximum benzene content in gasoline is well satisfied. In addition, this process produces 1,388 BPD of Benzene that fulfills the specification according to ASTM D-2359-02 for refined benzene-535 (minimum purity of 99.8 weight %.

In order to fulfill the specification according to ASTM D-2359-02 for refined benzene-535, would be enough to eliminate 706 BPD of Benzene from reformate. In this case, the gasoline pool has the composition as is shown in the Table 8, and it will produce 786 BPD of benzene inside the specification.

TABLE 8

Gasoline Pool with minimum elimination of Benzene in reformate gasoline, in order to fulfill ASTMD 2359-02 specification for refined benzene-535

| Fraction in the "pool" | BPD | Content of Benzene, volume % | BPD de Benzene in the fraction |
|---|---|---|---|
| Reformate Gasoline | 36,390 | 3.0 | 1,075 |
| FCC Gasoline | 31,878 | 0.8 | 255 |
| Alkylate | 29,105 | 0.03 | 9 |
| Isomerized | 19,113 | 0 | 0 |
| Raffinate and TAME and Rafinado | 9,928 | 0 | 0 |
| Gasoline de H-Oil | 3,595 | 0 | 0 |
| MTBE | 3,788 | 0 | 0 |
| TOTAL | 133,797 | 1.00 | 1,339 |
| Benzene | 706 | 99.8* min. | 706 |

*% weight

EXAMPLE 5

Benzene Adsorption

Following the method described in Example 2, some adsorption experiments were carried out for 10 ml of the $F_{40-85}$ fraction of a typical reforming gasoline using the microporous carbon adsorbent (MCA) material from this invention and the referred commercial adsorbents. The equilibrium adsorption is shown in Table 9. It should be noticed that the aromatics content in the fraction $F_{40-85}$ corresponds to Benzene content.

TABLE 9

Adsorption of compounds present in Reformate Gasoline

| Type of Compound | Adsorption, mg/g of adsorbent | | | | |
|---|---|---|---|---|---|
| | MCA | Zeolite Na Y | Zeolite Ag Y | Activated Carbon | Silica Gel |
| Aromatics | 218 | 110 | 130 | 150 | 114 |
| Isoparaffin | 0 | 0 | 0 | 0 | 0 |
| Cycloparaffin | 2 | 1 | 4 | 2 | 3 |
| Olefins | 5 | 7 | 19 | 2 | 2 |
| Lineal Paraffin | 63 | 13 | 16 | 23 | 14 |
| Total | 288 | 131 | 169 | 177 | 133 |

By comparing with the considered commercial adsorbents, activated carbon is the material closer to MCA in relation to total adsorption and aromatic compounds adsorption capacity, although the adsorption capacity in the MCA is higher in 45.3 and 62.7%, respectively.

EXAMPLES 6, 7 AND 8

Temperature Influence in the Benzene Adsorption

At bench scale, adsorption tests at different temperatures were carried out in gas phase in a stainless steel tube of 37 cm length and 0.49 cm inner diameter (FIG. 3).

In FIG. 3 the following sections are outlined: 1) feeding of the paraffin mixture, 2) carrier gas feeding 3) temperature sensor, 4) heating jacket, 5) column packed with the adsorbent material, 6) counter pressure valve, 7) temperature control fluid outlet, 8) temperature control fluid inlet, 9) refrigeration, 10) raffinated flow control valve, and 11) raffinated outlet.

The tubular adsorber (7 ml) was packed with the microporous carbon adsorbent (MCA) material from the present invention (3-4 g, 70-140 mesh). The MCA was activated previously with water steam (1600 ml, 240° C., 200 psi) and dried with a nitrogen flow (60 ml/min at 500° C.).

Maintaining this device at different temperatures, 30, 175 and 225° C., the fraction $F_{40-85}$ (4.5 ml, 3.2 g) was fed from the top section of the column. Samples of 0.1 ml were received at the outlet of the column at different times and the compounds present in each one were analyzed. It should be noticed that almost all the aromatic content presented in $F_{40-85}$ correspond to benzene, therefore a minor benzene amount in the outlet of the column represents a higher adsorption. The results for the first seven samples are shown in Table 10.

$$\% R = \frac{(CA_C - Ca_n)}{(CA_C - CA_0)} * 100$$

in which:
CA$_C$ is the feedstock aromatic content
CA$_n$ is the first fraction aromatic content in the n-regeneration
CA$_0$ is the first fraction aromatic content alter passing in the fresh adsorbent

TABLE 10

Adsorption of a Reformate Gasoline fraction in the MCA, at different temperatures

| Example | T, °C. | Type of Compound | feed-stock | M-1 | M-2 | M-3 | M-4 | M-5 | M-6 | M-7 |
|---|---|---|---|---|---|---|---|---|---|---|
| 6 | 30 | Aromatics | 17.9 | 2.2 | 2.3 | 2.8 | 3.4 | 5.1 | 7.0 | 8.1 |
| | | Isoparaffins | 54.5 | 70.3 | 69.9 | 68.8 | 67.5 | 65.4 | 63.4 | 60.9 |
| | | Cycloparaffins | 3.6 | 4.8 | 4.8 | 4.7 | 4.6 | 4.4 | 4.3 | 4.3 |
| | | Olefins | 1.8 | 1.6 | 1.6 | 1.7 | 1.7 | 1.8 | 1.8 | 3.1 |
| | | Paraffins | 22.2 | 21.1 | 21.3 | 22.0 | 22.6 | 23.2 | 23.4 | 23.3 |
| | | $g_{aa}/g_{adsorbent}$ | 0 | 0.003 | 0.006 | 0.009 | 0.012 | 0.015 | 0.017 | 0.019 |
| | | $g_m/g_{adsorbent}$ | 0 | 0.020 | 0.041 | 0.061 | 0.081 | 0.101 | 0.122 | 0.142 |
| 7 | 175 | Aromatics | 17.9 | 0.6 | 1.3 | 2.3 | 3.6 | 4.9 | 6.3 | 7.4 |
| | | Isoparaffins | 54.5 | 75.9 | 72.9 | 70.7 | 68.6 | 66.8 | 65.2 | 64.0 |
| | | Cycloparaffins | 3.6 | 5.1 | 4.9 | 4.7 | 4.6 | 4.5 | 4.4 | 4.3 |
| | | Olefins | 1.8 | 1.5 | 1.6 | 1.7 | 1.8 | 1.7 | 1.9 | 1.9 |
| | | Paraffins | 22.2 | 16.9 | 19.2 | 20.5 | 21.3 | 22.0 | 22.3 | 22.5 |
| | | $g_{aa}/g_{adsorbent}$ | | 0.004 | 0.008 | 0.012 | 0.016 | 0.019 | 0.022 | 0.025 |
| | | $g_m/g_{adsorbent}$ | | 0.020 | 0.045 | 0.073 | 0.101 | 0.126 | 0.154 | 0.181 |
| 8 | 225 | Aromatics | 17.9 | 0.2 | 0.7 | 2.0 | 4.0 | 6.5 | 8.7 | 10.4 |
| | | Isoparaffins | 54.5 | 79.8 | 75.7 | 71.5 | 67.7 | 64.4 | 61.9 | 60.2 |
| | | Cycloparaffins | 3.6 | 5.3 | 5.0 | 4.8 | 4.5 | 4.3 | 4.2 | 4.0 |
| | | Olefins | 1.8 | 1.4 | 1.5 | 1.7 | 1.8 | 1.9 | 1.9 | 1.9 |
| | | Paraffins | 22.2 | 13.3 | 17.0 | 20.0 | 22.0 | 22.9 | 23.3 | 23.4 |
| | | $g_{aa}/g_{adsorbent}$ | 0 | 0.005 | 0.012 | 0.018 | 0.024 | 0.028 | 0.032 | 0.035 |
| | | $g_m/g_{adsorbent}$ | 0 | 0.026 | 0.067 | 0.108 | 0.148 | 0.189 | 0.229 | 0.270 |

$g_{aa}/g_{adsorbent}$ = grams of aromatics adsorbed per gram of adsorbent.
$g_m/g_{adsorbent}$ = grams of recovered sample per gram of adsorbent.

According to the shown data outlined in Table 10, for the first sample, the adsorbed benzene percentage was around 88, 97 and 99% for 30, 175 and 225° C., respectively, whereas, for the sample 7 resulted 55, 59 and 42%, respectively. This effect should be considered when designing the process in order to define the best time and temperature of adsorption.

Results from Table 10, are shown in FIG. 4. Generally, it can be observed that, benzene adsorption diminished with the increase of adsorption time.

EXAMPLE 9

Regeneration of the Adsorbent MCA

By using equipment and conditions described in the Examples 6, 7 and 8, it was tested the regeneration of the MCA at different conditions and different regeneration agents (Table 11). The percentage of regeneration (% R) was calculated according the next equation:

TABLE 11

Regeneration of MCA adsorbent material

| Conditions | Regeneration Agent | | | | |
|---|---|---|---|---|---|
| | $N_2$ | $N_2$ | $CH_4$ | Water | *MeOH/H$_2$O (5/95 volume %) |
| Physical state | Gas | Gas | Gas | Vapor | Vapor |
| Pressure, kg/cm$^2$ man. | 2-3 | 2-3 | 2-3 | 15.8-17.6 | 15.8-17.6 |
| Temperature, °C. | 500 | 450 | 100 | 250 | 250 |
| Regeneration Parameter | | | | | |
| Bed Temperature, °C. | 500 | 100 | 100 | 170 | 170 |
| Time, minutes | 20 | 60 | 60 | 15 | 15 |
| Regeneration No. | Adsorption Capacity Recovering, % | | | | |
| 1 | 99.99 | 25.42 | 15.51 | 99.29 | 99.53 |
| 2 | 99.99 | 35.50 | 25.29 | 99.67 | 99.81 |
| 3 | 99.99 | 35.61 | 27.26 | 99.61 | 99.84 |
| 4 | 99.99 | 35.70 | 26.27 | 99.77 | 99.77 |

*MeOH.—Methyl Alcohol

From the results shown in Table 11 the preferred regeneration agents for the adsorbent MCA are $N_2$, water and MeOH/$H_2O$ (5/95 volume %), with less than 20 minutes regeneration times and with at least a 99.29% of the adsorbent MCA adsorption capacity recovery.

By analyzing the results shown in the Examples 1 to 9, it can be seen that the microporous carbon adsorbent (MAC) material presents an adsorption capacity and advantageous selectivity for benzene adsorption, considerably higher to the other commercial materials, as well as the regeneration of the MCA in the present invention can be perform with agents and systems available in refinery plants.

We claim:

1. A process for removal of benzene from a hydrocarbon stream, which comprises contacting a naphtha boiling range hydrocarbon feed stream with a microporous carbon adsorbent produced by the direct pyrolysis of Saran copolymers, said microporous carbon adsorbent having high selectivity to adsorb aromatic compounds, thereby removing benzene from said naphtha boiling range hydrocarbon feed stream by adsorption of said benzene, thereby separating said naphtha boiling range hydrocarbon feed stream into a benzene-rich microporous carbon adsorbent and an effluent hydrocarbon stream containing non-aromatic hydrocarbons.

2. The process of claim 1, wherein said benzene-rich microporous carbon adsorbent is subjected to desorption to remove benzene from said benzene-rich microporous carbon adsorbent.

3. The process of claim 1, wherein said Saran copolymer is a member selected from the group consisting of poly (vinylidene chloride-co-vinyl chloride), poly (vinylidene chloride-co-methyl acrylate), poly (vinylidene chloride-co-acrylonitrile), and poly (methyl acrylate-co-acrylonitrile).

4. The process of claim 3, wherein said Saran copolymer is poly (vinylidene chloride-co-vinyl chloride).

5. The process of claim 1, wherein said microporous carbon adsorbent has a pore size between 0.4 and 1.0 nm.

6. A process for the reduction of the benzene content in a naphtha boiling range hydrocarbon stream, which comprises subjecting a naphtha in the boiling range between 27 and 191° C. to a first separation by fractionation of C6's to provide a first stream having a boiling range between 50 and 90° C., passing said first stream through an adsorbent bed of microporous carbon adsorbent material produced by the direct pyrolysis of a Saran copolymer to reduce the benzene content and obtain a C6 effluent fraction and said microporous carbon adsorbent saturated with benzene, and regenerating said saturated microporous carbon adsorbent to separate the benzene.

7. The process of claim 6, wherein said Saran copolymer is selected from the group consisting of poly (vinylidene chloride-co-vinyl chloride) (PVDC-PVC), poly (vinylidene chloride-co-methyl acrylate) (PVDC-AM), poly (vinylidene chloride-co-acrylonitrile) (PVDC-ACN), and poly (methyl acrylate-co-acrylonitrile) (AM-ACN) and other related copolymers.

8. The process of claim 7, wherein said Saran copolymer is poly (vinylidene chloride-co-vinyl chloride).

9. The process of claim 6, wherein said microporous carbon adsorbent saturated with benzene is regenerated by pressure or temperature swing desorption or by displacement with a desorbent as an inert gas at high temperature, or by passing a desorbent which in a subsequent stage is distilled in a distillation section to separate the benzene from the desorbent.

10. The process of claim 6, wherein said naphtha has a boiling range between 38 and 191° C.

11. The process of claim 6, wherein said microporous carbon adsorbent has an equilibrium adsorption at least 322 mg Benzene/g of adsorbent.

12. The process of claim 6, wherein said $C_6$ effluent fraction is benzene-free, and reintegration of said benzene-free $C_6$ fraction to the hydrocarbon stream provides a gasoline with a benzene content less than 1 volume %.

13. The process of claim 6, wherein said separated benzene has a minimum purity of 99.8 weight % and a maximum toluene content of 0.1 weight %, satisfying the specifications of ASTM D-2359-02 for Refined Benzene-535.

14. The process of claim 6, wherein said microporous carbon adsorbent saturated with benzene is regenerated by pressure or temperature swing desorption or by displacement with a desorbent.

15. The process of claim 14, wherein said microporous carbon adsorbent is regenerated by displacement with a $N_2$, water or MeOH/$H_2O$.

* * * * *